United States Patent [19]

Laine et al.

[11] Patent Number: 4,617,341
[45] Date of Patent: Oct. 14, 1986

[54] POLYURETHANE LATEX SIZING AGENTS FOR THE PAPER INDUSTRY AND THEIR METHOD OF MANUFACTURE

[75] Inventors: Antoine Laine, Paris; Claude Senez, Gouvieux, both of France

[73] Assignee: Atochem, France

[21] Appl. No.: 735,844

[22] Filed: May 20, 1985

[30] Foreign Application Priority Data

Jun. 5, 1984 [FR] France .................... 84 08792

[51] Int. Cl.$^4$ ............................................. C08L 75/04
[52] U.S. Cl. ............................. 524/591; 106/287.23; 106/287.24; 106/287.26; 252/182; 524/874; 528/71
[58] Field of Search ................. 524/591, 874; 528/71; 106/287.23, 287.24, 287.26; 252/182

[56] References Cited

U.S. PATENT DOCUMENTS 3,971,764 7/1976 Schurmann et al. ................ 525/453

FOREIGN PATENT DOCUMENTS 1487913 10/1977 United Kingdom .

Primary Examiner—Maurice J. Welsh
Attorney, Agent, or Firm—Sigalos & Levine

[57] ABSTRACT

A sizing agent for the paper industry comprising a cationic oligourethane latex; said urethane having the formula:

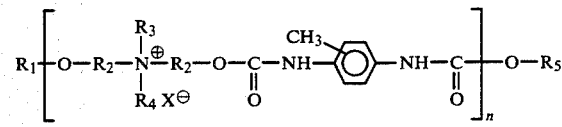

in which
$R_2$ is an alkylene radical containing a $C_2$–$C_6$ radical or a polyoxyalkylenic radical of a degree of polycondensation of 1 to 4,
$R_3$ is an alkyl radical containing at least 7 carbon atoms, and
$R_4$ and X represent the remainder of the quaternizing agent $R_4X$ with
(a) $R_1$ representing

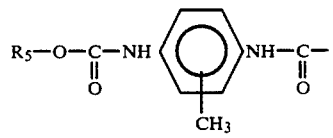

$R_5$ being an aliphatic radical containing $C_4$ as a maximum and n varying from 1 to 3; or
(b) $R_1$ representing

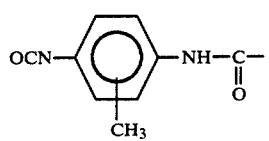

$R_5$ being

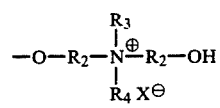

in which $R_2$, $R_3$, $R_4$ and X having the preceding definitions and n varying from 2 to 6; and the method of making the oligourethane latex.

11 Claims, No Drawings

POLYURETHANE LATEX SIZING AGENTS FOR THE PAPER INDUSTRY AND THEIR METHOD OF MANUFACTURE

BACKGROUND OF THE INVENTION

The present invention concerns a new agent for sizing in the paper industry, more particularly for paper and cartons, consisting of a cationic polyurethane dispersed in water in the form of a latex and its method of manufacture.

Cationic polyurethanes already are the subject of patents. It is, for instance, known to prepare a quaternary ammonium compound from a prepolymer with NCO terminal groups, obtained by the addition of a polyisocyanate to a dihydroxylated aliphatic monomer compound, elongated by an aliphatic diol containing a salifiable and/or quaternizable tertiary nitrogen atom. That is the case, for instance of French Pat. No. 2,256,937.

Cationic polyurethanes are described in French Pat. No. 2,322,236 which are reaction products of polyisocyanates of the diphenylmethane series and N-alkyldialkanolamines of the $C_5$–$C_{12}$ series whose alkyl chain contains $C_1$–$C_6$ and possibly reactive groups serving as chain terminators, polyurethanes carrying protonized and/or quaternized ammonium groups, in solution in water and utilized for the sizing of paper. These products, of low molecular weight and although hydrophilic, are recognized by their inventors as efficient, as compared to the cationic products for paper sizing known previously.

SUMMARY OF THE INVENTION

According to the invention, it has been found that the polyurethane oligomers whose alkyl chain exceeds 7 carbon atoms, utilized in the form of a latex, are particularly efficient for the interior sizing of paper. Interior paper sizing consists of incorporating, during the formation of the sheet, organic products destined to reduce; indeed eliminate, the hydrophilic nature of the paper in order to render them suited for printing and writing.

Briefly stated, the present invention comprises a sizing agent comprising a cationic polyurethane in the form of an oligourethane latex; said urethane having the formula:

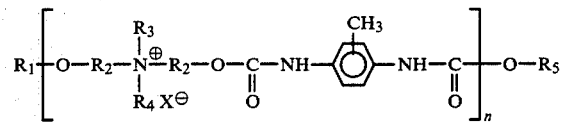

in which $R_2$ is an alkylene radical containing a $C_2$–$C_6$ radical or a polyoxyalkylenic radical of a degree of polycondensation of 1 to 4, $R_3$ is an alkyl radical containing at least 7 carbon atoms, and $R_4$ and $X$ represent the remainder of the quaternizing agent $R_4X$ with (a) $R_1$ representing

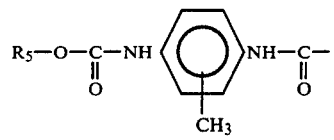

$R_5$ being an aliphatic radical containing $C_4$ as a maximum and n varying from 1 to 3; or (b) $R_1$ representing

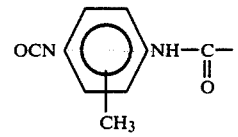

$R_5$ being

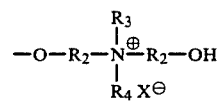

in which $R_2$, $R_3$, $R_4$ and $X$ having the preceding definitions and n varying from 2 to 6.

The invention also comprises the method of making such products as hereinafter described.

The invention also includes a method for the sizing of paper characterized by the fact that these sizing products can be utilized in neutral medium. It is understood that the term "sizing" concerns both interior sizing, as well as a sizing on the surface of the paper after it has been formed.

DETAILED DESCRIPTION

The latexes of the present invention are intended as sizing agents for the paper industry. As used herein "paper" means any paper or paperboard product that is usually sized such as wrapping paper, cartons, and the like.

The oligourethanes utilized according to the invention are reaction products of an organic polyisocyanate; under the circumstances toluene diisocyanate (TDI), of a dialkanolamine N-substituted by an aliphatic chain containing at least 7 carbon atoms, and possibly a monofunctional compound acting as chain terminator. These reaction products are converted into oligourethanes containing quaternized ammonium ions by the reaction of the tertiary N atoms of the N-alkyldialkanolamine with a suitable quaternizing agent. Preferably, the N-alkyldialkanolamine is modified into quaternary ammonium prior to its reaction with the toluene diisocyanate. The degree of quaternization is such that the oligourethane can be autodispersible without, however, impairing the hydropholic power of the product.

The proportions of the starting products are selected in such a way as to obtain a polymer of a maximum molecular weight of 3000 and capable of descending down to 500 in the case of the use of a chain breaker or terminator.

The products of the invention thus are cationic oligourethanes having a molecular weight between 500 and 3000 possessing a significant hydrophobic power dispersible in water in order to form a stable latex capable of being adsorbed on the cellulosic fibers and thus utilizable for paper sizing.

For the preparation of these oligourethanes, the toluene 2,4- or 2,6-diisocyanates as well as their mixtures (TDI) are utilized as the polyisocyanate.

By "N-alkyldialkanolamine" we mean the organic compounds containing two hydroxy groups, each linked to the nitrogen atom by an aliphatic chain of 2 to 6 carbon atoms or polyoxyalkylenic chain of a degree of polycondensation of 1 to 4, and a hydrophobic aliphatic substituent which is also linked to the nitrogen atom and thus containing at least 7 carbon atoms. The stearyldiethanolamine is particularly useful. Under the conditions of the invention; i.e., in reaction with the TDI according to the operating procedure described below, the dialkanolamines having too short an N-alkyl chain do not permit ending up with effective latexes for paper sizing.

The polyalkylenic (polyalkylene) chain preferably comes from the condensation of ethylene oxide, propylene oxide, or butylene oxide.

In case one is utilized in order to limit the molecular weight of the oligourethane, a short primary monoalcohol as, for instance, ethanol is preferred as chain terminator.

Within the scope of the invention, it is preferable to put the tertiary dialkanolamine into its quaternized form prior to its reaction with toluene diisocyanate. Nevertheless, it is not impossible to convert the tertiary amine into quaternary ammonium after or even during the formation of the oligourethane. The quaternizing agents which are suitable are in principle all of the quaternizing substances. We shall cite preferably compounds containing an activated halogen such as, for instance, methyl chloride, bromide, or iodide, benzylchloride, allyl chloride, or yet epichlorohydrin or the active esters such as, for instance, dimethyl sulfate.

The oligourethanes described according to the invention are composed of structural units of the general formula $(AB)_n$, with A corresponding to the quaternized N-alkyldialkanolamine, B corresponding to toluene diisocyanate, and n varying from 1 to 6 depending on whether or not a chain rupturing compound is used.

The cationic oligourethane can thus be written in the following manner:

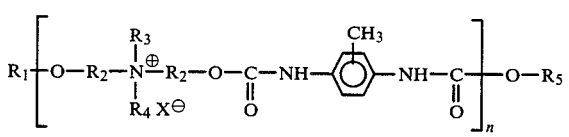

in which
$R_2$ represents an alkylene radical containing a $C_2$-$C_6$ radical or a polyoxyalkylenic radical of a degree of polycondensation of 1 to 4,
$R_3$ represents an alkyl radical containing $C_7$ as a minimum, and
$R_4$ and X represent the remainder of the quaternizing agent $R_4X$
and in which $R_1$ and $R_5$, as well as n, have the following meanings:
(a) when a chain terminator is used $R_1$ representing

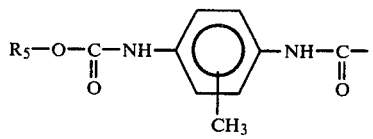

$R_5$ being an aliphatic radical containing $C_4$ as a maximum and n varies from 1 to 3; or
(b) when a chain terminator is not used $R_1$ representing

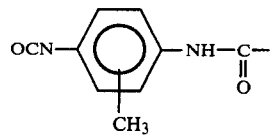

$R_5$ being:

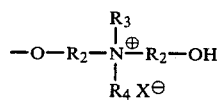

in which $R_2$, $R_3$, $R_4$ and X having the preceding definitions and n varies from 2 to 6.

The time of quaternization of the tertiary dialkanolamine does not in any manner enter into the chain structural of the oligourethane.

The reaction between the polyisocyanate, under the circumstances toluene diisocyanate, and the possibly quaternized dialkanolamine is customarily carried out in the solvent phase in order to better control the exothermic character of the reaction and thus to limit the risks of cross-linking leading to nonexploitable gelifications.

The solvents used have a low boiling point so that they can easily be eliminated from the final latex. These solvents moreover should facilitate the dispersion of the polymer in water. Methylene chloride ($CH_2Cl_2$) in such proportions that the oligourethane obtained has a dry extract between 20 and 75 is one of the preferred solvents.

The use of a catalyst promoting the polymerization reaction between the toluene diisocyanate and dialkanolamine is not of interest since it goes against the invention which consists of making oligourethanes of low molecular weight. On the contrary, the use of a chain terminator such as, for instance, ethanol contributes advantageously to limit the molecular weight.

The quaternization of the N-alkyldialkanolamine, and more particularly stearyldiethanolamine, is carried out between 25° C. and 100° C. by an appropriate quaternizing agent defined previously. The degree of quaternization preferably is between 10 and 60 percent with respect to the quaternizable nitrogen atoms. Too high a quaternization hurts the effectiveness of the final product since it contributes to increasing its hydrophilic character. Too low a quaternization does not permit dispersing the polymerization product correctly. It is noted that methyl sulfate is one of the most apprpriate quaternizing agents insofar as its action is very rapid.

The oligourethane carrying quaternized nitrogen atoms is generally obtained under agitation by the progressive addition of toluene diisocyanate to the quaternized N-alkyldialkanolamine diluted in methylene chloride in such a way as to obtain a dry extract of the organic oligourethane amounting to between 20 and 75%. The reaction, which is exothermic, is controlled by the rate of introduction of the toluene diisocyanate; the temperature is limited by the reflux of the solvent. One customarily operates so that there is an excess of OH groups with respect to the NCO groups in the reaction vessel. Thus, the toluene diisocyanate and the constituents having OH terminal groups, both the alkanolamine and the chain terminator, can be used in such proportions that the NCO/OH ratio is less than or preferably equal to 1.

After the polymerization reaction, the organic solution of cationic oligourethane is placed in dispersion in water. This placement into emulsion in water of the oligourethane in solution in the solvent is faciitated by the use of a third solvent. The purpose of this solvent is to homogenize the system of the three constituents of the mixture in dispersion: the oligourethane, its solubilization solvent and the water. For instance, the combination of acetone with the methylene chloride, two solvents whose behavior is totally opposite with respect to water, promotes obtaining fine and stable dispersions.

The quantity of third solvent necessary for the optimization of the degree of fineness of the dispersion is a function of the size of the oligourethane as well as the quantity of solvent in which it is solubilized. In the case, for example of the acetone/methylene chloride pair, depending on the particular cases, 2 to 5 times as much acetone as methylene chloride is required. The amount of water necessary for the dispersion must be above a certain threshold determined by the total amount of solvents, below which it is impossible to obtain a stable and effective latex. The optimum quantities can be readily determined for each particular oligourethane and amount of solvent in which it is solubilized by making test batches.

The mixing of the aqueous phase and the organic phase, in the presence of a third solvent, can be carried out by any conventional continuous operation mixing device. Otherwise, in the case of a normal but nevertheless active agitation, it is in our interest to add the water progressively into the organic phase until inversion of phase takes place, indicated by a sudden decrease in viscosity of the mixture in dispersion.

The solvents are then eliminated by distillation.

According to the procedure, cationic oligourethane latexes are obtained having dry matter content values of 10 to 30 percent by weight. The particle dimension generally does not exceed $0.5\mu$ conferring an excellent stability upon the latexes.

Another interest point resides in the neutrality of the latexes obtained whose pH values are between 6 and 7. Such products can thus be utilized in neutral medium, thus avoiding the numerous disadvantages of standard sizes that must be used in acid medium.

They can be used with all of the usual fillers used in the paper industry.

The invention will be further described in connection with the following examples which are set forth for purposes of illustration only.

EXAMPLE 1

A. Quaternization of the Amine

One introduces into a reactor, topped by a condenser and equipped with an agitation device, 233.5 parts of a diethanolamine derived from fatty acids of tallow, thus principally containing $C_{18}$ (NORAMOX $S_2$ from CECA) and 16.5 parts of dimethyl sulfate. The mixture heats up to about 70° C. The quaternization is teminated as soon as the exothermic reaction is finished.

B. Polymerization

The previously quaternized NORAMOX $S_2$ is diluted in 538.5 parts of methylene chloride to which 60.3 parts of ethanol are added. 228.2 parts of TDI 80/20 (mixture of 80% of TDI-2,4 and of 20% TDI-2,6) are then added progressively, always under agitation. The reaction mixture heats up. The rate of introduction of TDI is such that the reflux of the solvent can be kept uniform.

One thus obtains a cationic oligourethane with 50% dry matter in the methylene chloride, corresponding to the formula given in the description, with a degree of quaternization of 20%. C. Formation of the Latex 150 parts of acetone are added to 100 parts of oligourethane in the methylene chloride previously prepared. 250 parts of water are then added under violent agitation in order to form a polymer/water/solvents emulsion. The methylene chloride and the acetone are then removed by distillation.

We thus obtain a latex having 17% by weight of dry matter. The dry extract of the latex can be brought to 30% by eliminating part of the water.

EXAMPLE 2

Operation is carried out according to Example 1, but by replacing the NORAMOX $S_2$ by NORAMOX $C_2$ (product of CECA) which is a diethanolamine deriving from coconut oil and thus containing fatty chains containing $C_{12}$ (48%), $C_{14}$ (17%), $C_{16}$, $C_8$, $C_{10}$ and others. 146.5 parts of NORAMOX $C_2$ are quaternized by 12.6 parts of dimethyl sulfate and then diluted in 961.5 parts of methylene chloride.

46 parts of ethanol are added and then 174 parts of TDI 80/20 are introduced progressively. The cationic oligourethane obtained amounts to 28% of dry matter in the methylene chloride, corresponding to the formula given in the description with a degree of quaternization of 20%.

100 parts of this solution of oligourethane in methylene chloride are mixed with 200 parts of acetone and then emulsified under violent agitation in 300 parts of water.

The solvents are then eliminated. A latex is obtained whose dry matter content goes from 9.5% to 30% by weight depending on the amount of water being eliminated.

EXAMPLE 3

A. Polymerization

One introduces into a reactor topped by a condenser and equipped with an agitation device 178 parts of NORAMOX $S_2$ in 534 parts of methylene chloride and then one progressively adds 87 parts of TDI 80/20 in 261 parts of methylene chloride.

B. Quaternization

The entire amount of the methylene chloride is substituted by 795 parts of ethyl acetate. 41.6 parts of epichlorohydrin are then added. The reaction mixture is then raised to 70° C. for 4 hours. The cationic oligourethane obtained corresponding to the formula given in the description possesses a degree of quaternization of 20%.

C. Latex Formation

For 100 parts of polymer in ethyl acetate previously prepared, one adds under strong agitation 100 parts of acetone and then 200 parts of water in order to form an emulsion. The solvents are removed by distillation.

A latex is thus obtained, having 14 to 30% by weight of dry matter depending on the amount of water which is eliminated.

EXAMPLE 4

A. Quaternization 178 parts of NORAMOX $S_2$ and 31.5 parts of dimethyl sulfate are introduced into a reactor topped by a condenser and equipped with an agitation device. The mixture heats up to about 70° C. The reaction is practically instantaneous.

B. Polymerization

The quaternized NORAMOX $S_2$ is diluted in 795 parts of methylene chloride. Then 87 parts of TDI 80/20 are progressively added. One thus obtains a cationic oligourethane in the methylene chloride, corresponding to the formula given in the description with a degree of quaterization of 50%.

C. Latex Formation 100 parts of the oligourethane solution obtained are mixed with 200 parts of acetone and then emulsified under strong agitation in 350 parts of water. The solvents are then removed.

A latex of 7% to 30% by weight of dry matter is thus obtained, depending on the amount of water eliminated.

EXAMPLE 5

Operation takes place according to Example 1, but by replacing the dimethyl sulfate by 12 parts of epichlorohydrin. The oligourethane obtained possesses a degree of quaternization of 20%.

EXAMPLE 6

Operation takes place according to Example 2 by quaternizing 75.8 parts of NORAMOX $C_2$ by 13 parts of dimethyl sulfate. The polymerization is carried out by adding 23 parts of ethanol, 481 parts of methylene chloride, then progressively 87 parts of TDI 80/20. The cationic oligourethane obtained possesses a degree of quaternization of 40%.

100 parts of organic oligourethane thus obtained are emulsified in the presence of 200 parts of acetone, in 300 parts of water. The solvents are then removed.

EXAMPLE 7 (COMPARATIVE)

Oligourethane latexes are produced from TDI and a diethanolamine which in N-substituted by a short chain. It is found that these latexes, difficult to obtain, are totally ineffective for paper sizing.

Test 1:

151.3 parts of TDI 80/20 are progressively added to a mixture of 51.7 parts of N-methyldiethanolamine, 40 parts of ethanol and 729 parts of methylene chloride. The latter is then replaced by the same amount of ethyl acetate, and quaternization then takes place at 70° C. for 4 hours by 10 parts of epichlorohydrin.

100 parts of quaternized oligourethane are emulsified in 400 parts of water in the presence of 100 parts of acetone. The solvents are then removed.

Test 2:

The isopropanol plays the double role of solvent and chain terminator. The oligourethane P is obtained by the progressive addition of 65.4 parts of TDI 80/20 to 33.1 parts of N-methyldiethanolamine in 66.5 parts of isopropanol.

Test 2.1:

The oligourethane P is quaternized by 15 parts of epichlorohydrin for 4 hours at 60° C. after having been rendered soluble in a mixture comprising 200 parts of ethyl acetate and 300 parts of acetone.

200 parts of the quaternized oligourethane in solution are emulsified in 550 parts of water. The solvents are then removed. Latex A is obtained.

Test 2.2:

The oligourethane P is dissolved in an aqueous acetic acid solution. The solution B obtained has a pH of 3.

EXAMPLE 8

For the study of sizing properties on paper, one uses the COBB test in conformity with ASTM standard D.3285 or with French standard Q 03-018. This test determines the amount of water which can be absorbed by a paper or a carton during a given time. One measures the weight of water retained per unit surface during a fixed duration of time. The lower the amount of water absorption, the better the sizing effect.

The sizing agent is used as an internal size to form the sized paper. The paper is prepared according to conditions similar to an industrial fabrication, from a long fiber cellulose which has been bleached and refined at 25° S.R. and to which the sizing product has been added in different proportions. The paper formed has a weight of 65 g/m².

The measurement of the COBB test is carried out on a circular sample of 100 cm² surface area. The contact time between the water and the paper sample amounts to 50 seconds.

For the sake of comparison, in the tests one likewise uses a cationic sizing product which is already known and can be used like the products of the invention in neutral medium and added as the paper is being formed; namely AQUAPEL 360 from HERCULES.

The results obtained are summarized in the following table.

The degree of sizing is given in active substance with respect to the dry cellulose.

| Sizing Product | Degree of Sizing in the Paper | | COBB 60 |
|---|---|---|---|
| | I | II | |
| AQUAPEL | 0.15% | — | 21.0 |
| | 0.5% | — | 22.1 |
| EXAMPLE 1 | 0.25% | — | 27.3 |
| EXAMPLE 2 | 0.5% | — | 27.2 |
| EXAMPLE 3 | 0.4% | — | 20.0 |
| EXAMPLE 4 | 0.5% | — | 23.9 |
| EXAMPLE 5 | 0.5% | — | 22.0 |
| EXAMPLE 6 | 0.5% | — | 27.8 |
| COMPARATIVE EXAMPLE 7 | | | |
| Test 1 | 0.5% | 2% | pierce through |
| Latex A | 0.5% | 2% | pierce through |
| Solution B | 0.5% | 2% | pierce through |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A sizing agent comprising an oligourethane latex; said urethane having the formula:

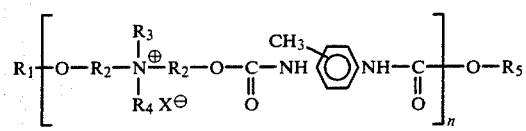

in which $R_2$ is an alkylene radical containing a $C_2$–$C_6$ radical or a polyoxyalkylenic radical of a degree of polycondensation of 1 to 4, $R_3$ is an alkyl radical containing at least 7 carbon atoms, and $R_4$ and X represent the remainder of the quaternizing agent $R_4X$ with (a) $R_1$ representing

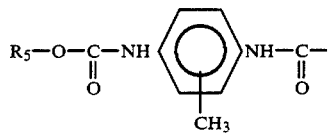

$R_5$ being an aliphatic radical containing $C_4$ as a maximum and n varying from 1 to 3; or (b) $R_1$ representing

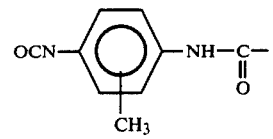

$R_5$ being

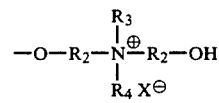

in which $R_2$, $R_3$, $R_4$ and X having the preceding definitions and n varying from 2 to 6.

2. The sizing agent of claim 1, wherein the degree of quaternization with respect to the quaternizable nitrogen atoms is between about 10 and 60%.

3. The sizing agent of claim 1 or 2, wherein the moledular weight of the oligourethane is between 500 and 3000.

4. The method of making the sizing agent of claim 1 comprising reacting a polyisocyanate and a quaternized N-alkyldialkanolamine containing two hydroxy groups each linked to the nitrogen atom by an aliphatic chain of 1 to 6 carbon atoms, or a polyoxyalkylenic chain of a degree of polycondensation of 1 to 4, with the N-substituent containing at least 7 carbon atoms and then dispersing the resultant oligourethane obtained in water to form a latex.

5. The method of claim 4, wherein the reaction of the polyisocyanate with the dialkanolamine takes place in a solvent medium and said polyisocyanate is toluene diisocyanate.

6. The method of claim 5, wherein said solvent is methylene chloride.

7. The method of claim 6, wherein the reaction between the toluene diisocyanate and the dialkanolamine takes place in the presence of a chain terminator.

8. The method of claim 7, wherein the chain terminator is ethanol.

9. The method of claim 4, 5, 6, 7, or 8, wherein the NCO/OH ratio of the reaction medium is no greater than about 1.

10. The method of claim 4, 5, 6, 7, or 8, wherein the oligourethane is dispersed in water in the presence of a solvent.

11. The method of claim 4, 5, 6, 7, or 8, wherein the oligourethane is dispersed in water in the presence of acetone.

* * * * *